United States Patent [19]

Hückler et al.

[11] Patent Number: 4,549,637

[45] Date of Patent: Oct. 29, 1985

[54] GEAR SHIFT ARRANGEMENT FOR A VEHICLE

[75] Inventors: Volker Hückler, Radolfzell; Eugen Sonns, Heddesheim; Helmut Schäfer, Ketsch; Dieter Nobis, Mannheim, all of Fed. Rep. of Germany

[73] Assignee: Deere & Company, Moline, Ill.

[21] Appl. No.: 409,478

[22] Filed: Aug. 19, 1982

[30] Foreign Application Priority Data

Aug. 26, 1981 [EP] European Pat. Off. ........ 81303909.6

[51] Int. Cl.⁴ ..................... G05G 5/10; B60K 41/22
[52] U.S. Cl. ................................. 192/3.63; 74/477; 74/483 R
[58] Field of Search ............... 192/3.65, 3.55, 3.63, 192/3.54, 0.098; 74/15.4, 477, 745, 483 R

[56] References Cited

U.S. PATENT DOCUMENTS

| | | | |
|---|---|---|---|
| 3,056,381 | 10/1962 | Barnett | 74/483 R |
| 3,741,035 | 6/1973 | May | 192/3.54 |
| 3,783,985 | 1/1974 | May | 192/3.54 |
| 4,023,418 | 5/1977 | Zenker | 74/745 |
| 4,146,120 | 3/1979 | Stevens | 192/3.63 |
| 4,406,356 | 9/1983 | Prince | 192/3.62 |
| 4,438,657 | 3/1984 | Nobis | 74/473 R |
| 4,441,379 | 4/1984 | Malkowski et al. | 74/477 |

Primary Examiner—Rodney H. Bonck
Assistant Examiner—Alan G. Towner

[57] ABSTRACT

A vehicle, such as a tractor, has a main change-speed gear with an associated clutch and a load shift gear coupled to a selector rod. The load shift gear can be shifted under load between a normal position and an under-speed position which produces increased tractive effort by reducing the speed by about 20%. This load shift gear can be operated by the same lever as operates the main change speed gear. In order to prevent simultaneous operation of the main gear and the load change gear, with corresponding interference with the synchronization of the main gear, an interlock device is provided. The interlock device includes a bellows which is connected into the hydraulic circuit for the clutch and, when the clutch pedal is depressed, the bellows holds a plunger in interlocking engagement with one of two grooves in the selector rod which is mechanically coupled to the load change gear. In other embodiments, a mechanical linkage between the clutch pedal and the interlock device is provided.

13 Claims, 6 Drawing Figures

GEAR SHIFT ARRANGEMENT FOR A VEHICLE

BACKGROUND OF THE INVENTION

The present invention relates to a gear shift arrangement for a vehicle with a main change-speed gear, a clutch which is disengaged when a gear change is effected, and a load shift gear which is operable while the vehicle is under load.

In U.S. patent application, Ser. No. 302,327, filed 15 Sept. 1981, now U.S. Pat. No. 4,438,657, 1981 there is described therein an arrangement for controlling the main change-speed gear and the load shift gear. The load shift gear can be shifted under load between a normal position and an underspeed position in which there is a speed reduction of, say, 20%, and a corresponding increase in tractive force of, say, 25 to 30%. The load shift gear enables the driver of a tractor to deal with a momentary resistance, causing the engine to labor by shifting temporarily into underspeed. Unnecessary main gear changes are avoided. A single gear lever works in a gate for selecting the main gear. Moreover, the gate is pivotally mounted and linked to the load shift gear. In any main gear, the gear lever can be swung laterally to shift between normal and underspeed positions of the load change gear.

Since the load change gear is designed to operate under load, it operates, if correctly used, under synchronized conditions. It is not desirable to have the load change gear operate outside these conditions because it can lead to an increase in the relative speed of rotation of parts and thereby increase the demands made upon the synchronizing elements of the main gear. In the aforesaid application, it is already proposed to exclude the possibility of operation of the load change gear when the main gear is in neutral. In the first place, lateral movement of the gear lever in neutral takes place freely in the cross-slot of the gate without pivotal movement of the gate. In the second place, inadvertent movement of the gate in neutral, (e.g. because foreign matter provides the gear lever moving freely in the gate), is blocked by a mechanical interlock between the gear lever and the selector linkage for the load change gear.

This prior design does not, however, prevent simultaneous actuation of the main gear shift and the load change gear and, if the driver inadvertently, in going through the gate, also actuates the load change gear, (double actuation), severe synchronization problems are liable to occur.

SUMMARY OF THE INVENTION

An object of the present invention is to provide an interlock device between the clutch and the load shift gear which prevents actuation of the load shift gear when the clutch is disengaged. This and other objects are achieved by the present invention which comprises an interlock device which includes a selector rod coupled to a load shift gear. The selector rod has a pair of detent grooves therein for receiving a detent plunger. A spring urges the detent plunger towards the selector rod. A mechanically or hydraulically operated member moves in response to clutch disengagement to engage the detent plunger and hold it in one of the detent grooves while the clutch is disengaged. Since the real risk is double actuation when going through the gate, the clutch interlock, alone, can be used to give a more or less complete guarantee of satisfactory operation. Nevertheless, a neutral interlock, as shown in the aforementioned application, can also be provided, if desired.

DETAILED DESCRIPTION

Figure 1:
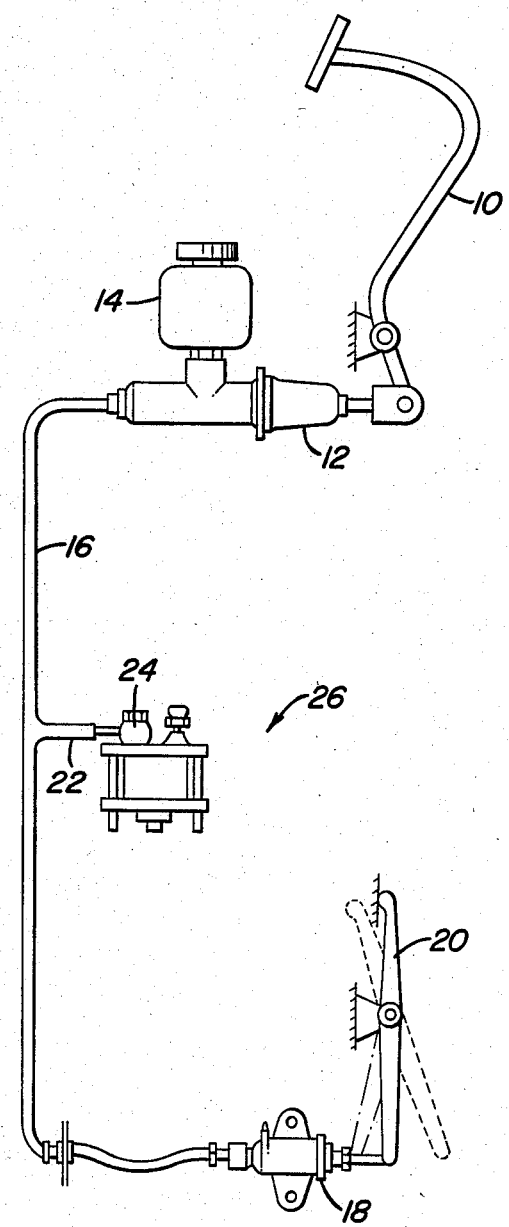
FIG. 1 is a diagram of a hydraulic clutch system plus a hydraulic interlock device.

FIG. 1 shows a conventional hydraulic clutch operating arrangement plus a hydraulic interlock device provided in accordance with the present invention. A foot pedal 10 operates a master cylinder 12 provided with a reservoir 14 for the hydraulic fluid (brake fluid). The master cylinder 12 is connected by a line 16 to a slave cylinder 18 which actuates the release fork or lever 20 for the clutch in a well known manner. The clutch, itself, is not shown but it is conventionally arranged in the transmission between the engine and the main gear box.

The hydraulic line 16 has a branch line 22 connected by way of a ring union 24 to an interlock device 26. The device 26 is mounted on the casing of a load change gear which is not shown in FIG. 1.

Figure 2:
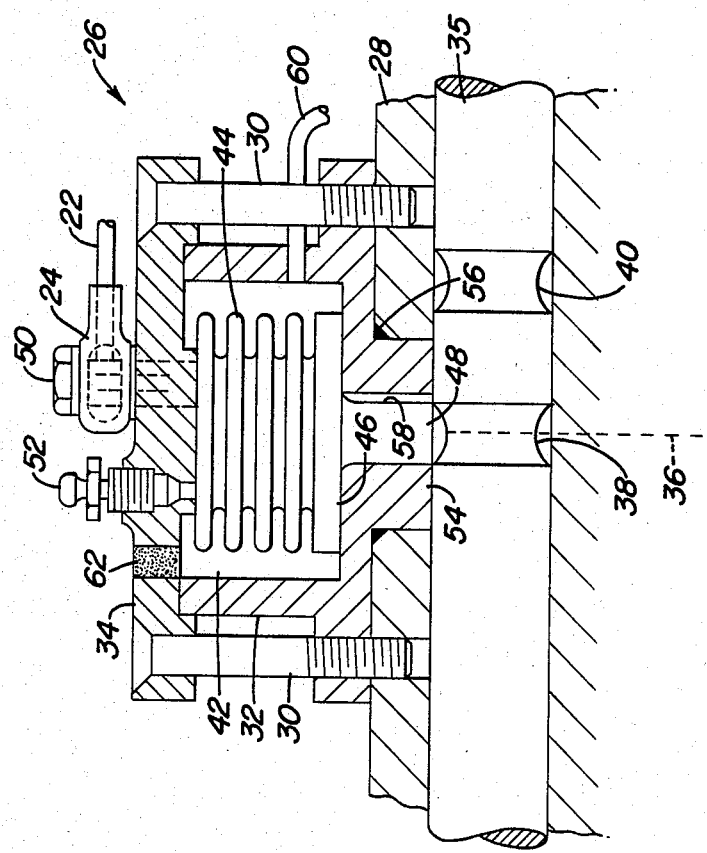
FIG. 2 is a cross-section of the hydraulic interlock device.

Referring now to FIG. 2, the interlock device 26 is shown mounted on the casing 28 of the load change gear by means of screws 30. The interlock device comprises a base cup 32 and a cover plate 34. The screws 30 pass through flanges on the cover and the cup. The load change gear is of known construction and is represented solely by a part of its casing 28 and a selector rod 35 slidable in a bore in the casing. The rod 35 has a normal position (as illustrated) in which a first locating groove 38 is lined up with a center line 36 of the interlock device. In a second, underspeed position, a second locating groove 40 is lined up with the center line 36.

The base cup 32 and cover 34 enclose a chamber 42 which contains a flexible metal bellows 44 sealed at the top to the cover 34 and at the bottom to the head 46 of a detent plunger 48. The aforementioned union 24 is attached to the top of the cover by a hollow bolt 50 and communicates therethrough with the interior of the bellows 44. The cover 34 is also fitted with an air bleed nipple 52 also communicating with the interior of the bellows 44.

The plunger 48 extends down through a bore in the bottom of the base cup 32 and through a locating boss 54 on the underside of the base cup. The boss 54 is received in a corresponding bore in the gear casing 28 and is sealed by a sealing ring 56.

The end of the plunger 48 is smoothly rounded and can engage in either of the grooves 38 and 40 in the selector rod 35. These grooves are correspondingly of arcuate cross-section. The bellows 44 act as a compression spring biasing the plunger into engagement with one of the grooves but, so long as the hydraulic pressure in the line 22 is low, it is possible to shift the rod 35 between the normal and underspeed positions, the plunger 48 being cammed out of one groove and then dropping into the other. Although the movement of the rod 35 is possible, the plunger 48 nevertheless provides positive location at each of the two positions. When, however, the clutch pedal 10 is depressed in order to effect a gear change in the main gear box, the pressure of the hydraulic fluid in the lines 16 and 22 rises very substantially and the pressure inside the bellows 44 holds the head 46 of the plunger 48 firmly down against the bottom of the base cup 32 so that the plunger head is firmly held in one or the other of the locating grooves 38 and 40. It is therefore not possible to move the selector rod 35 until the clutch pedal 10 has been released again. In this way, all possibility of actuating the load change gear simultaneously with the main gear is excluded.

Since transmission fluid from the load change gear will tend to seep past the rod 35 and past the plunger 48, it is preferred to provide a groove 58 in the plunger 48 so that there is a natural route for seepage into the chamber 42. This chamber is returned to the transmission fluid sump by a return line 60. A filter plug 62 in the cover 34 allows the chamber 42 to breath while preventing contamination of the transmission fluid. The bellows 44 ensures absolute separation between the hydraulic fluid circuit of the clutch and the transmission fluid.

The device, as illustrated in FIG. 2, is simple and inexpensive to install on the casing of the load change gear but is nevertheless fully effective in preventing simultaneous actuation of this gear with the main change speed gear.

Figure 3:
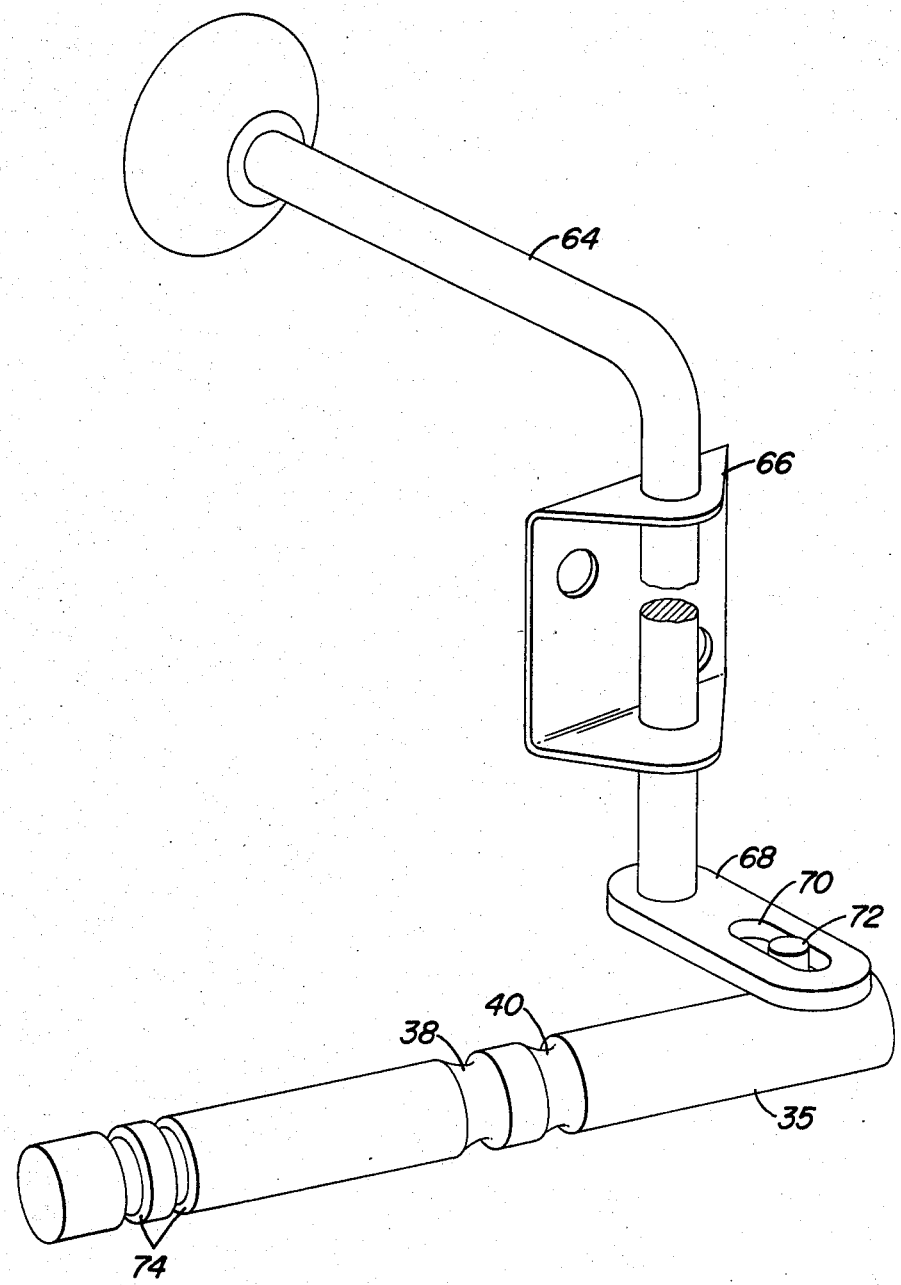
FIG. 3 is a perspective view of an arrangement using a separate lever for actuating the load change gear.

The way in which the selector rod 35 is operated is not critical for the purposes of the present invention. FIG. 3 shows one possibility in which the rod 35 is actuated by a separate lever 64 mounted in a bracket 66 and carrying an arm 68 with a slot 70 which engages a pin 72 on the rod 35. FIG. 3 also shows the grooves 38 and 40 and shows further grooves 74 by way of which the rod 35 selects normal or underspeed operation of the load change gear, in well known manner.

Figure 4:
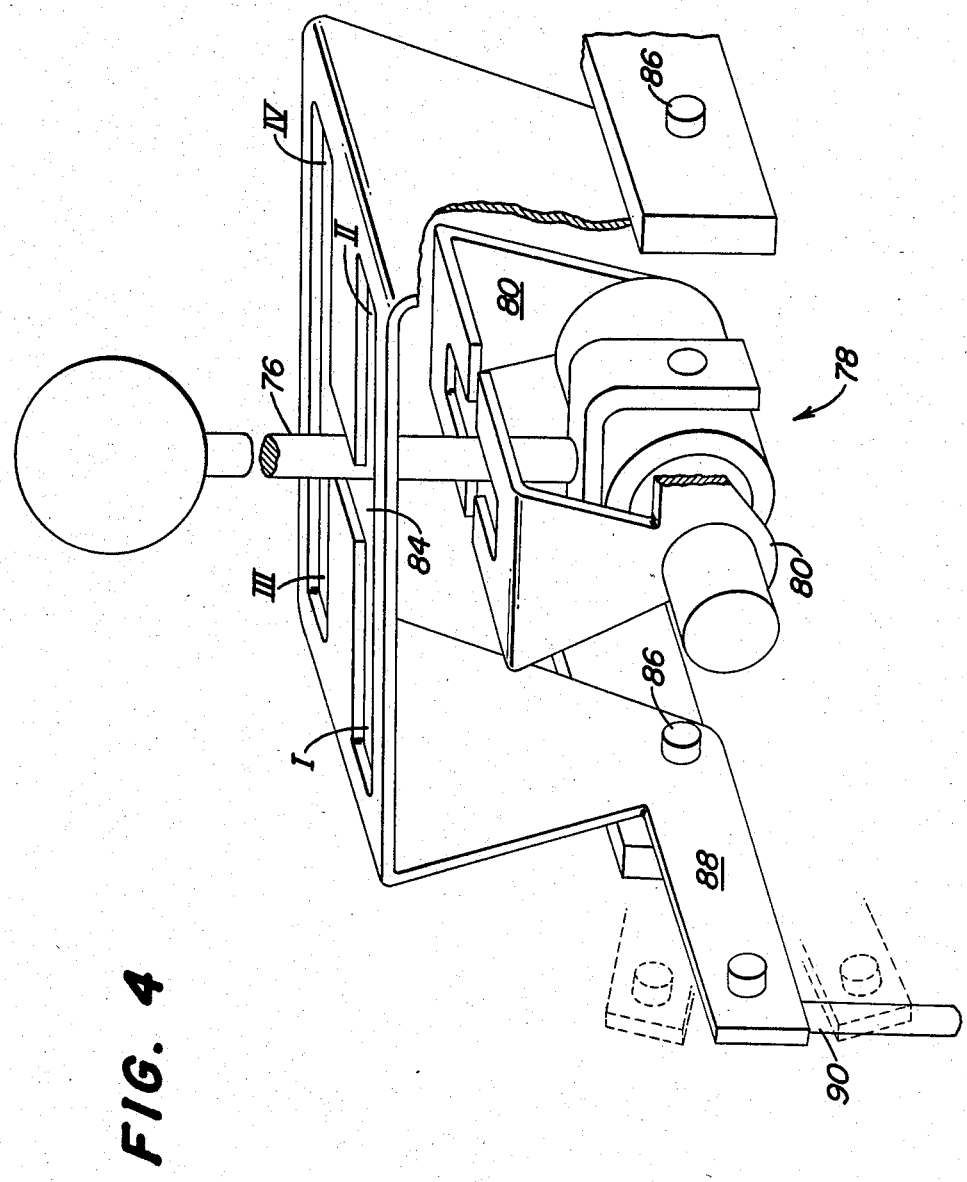
FIG. 4 is a perspective view of an arrangement using the main gear lever for actuating the load change gear.

FIG. 4 shows another possibility in accordance with the proposal of the above mentioned application. The gear lever 76 for the main gear box is mounted at its lower end on a cardan mounting 78 and operates the selector forks of the main gear box by way of two selector levers 80, in a manner well known in itself. The lever 76 moves in an H gate 82 and is illustrated in neutral, residing in the neutral cross slot 84 of the gate. The gate 82 is not a conventional fixed gate but is in the form of an inverted U bracket pivotally mounted by pins 86 for lateral swinging about a fore-and-aft axis (relative to the direction of travel of the vehicle). This axis is coincident with one of the axes of the cardan mounting 78. Movement of the lever 76 within the neutral slot 84 does not cause any corresponding movement of the gate 82. However, when the lever 76 is in any of the positions, I, II, III or IV, corresponding to the four gears of the main gear box, lateral movement of the gear lever 76 causes corresponding swinging of the gate 82 about the axis defined by the pivot pins 86.

An arm 88 integral with the gate bracket 82 is connected to the selector rod 35 of the load change gear. The linkage is represented only partially in FIG. 4 by a rod 90. This may be connected to the rod 35 by way of a bell crank lever, for example.

A further advantage of the embodiment of the device, according to FIG. 2, is that no O-rings or other seals are required between moving parts because of the provision of the bleed groove 58 and sump return pipe 60. Nevertheless, a sealed form of construction is not precluded, as will become apparent from the mechanical embodiments now to be described with reference to FIGS. 5 and 6. In these embodiments, the same reference numerals have been employed for parts the same as or similar to the parts of the embodiment of FIG. 2

Figure 5:
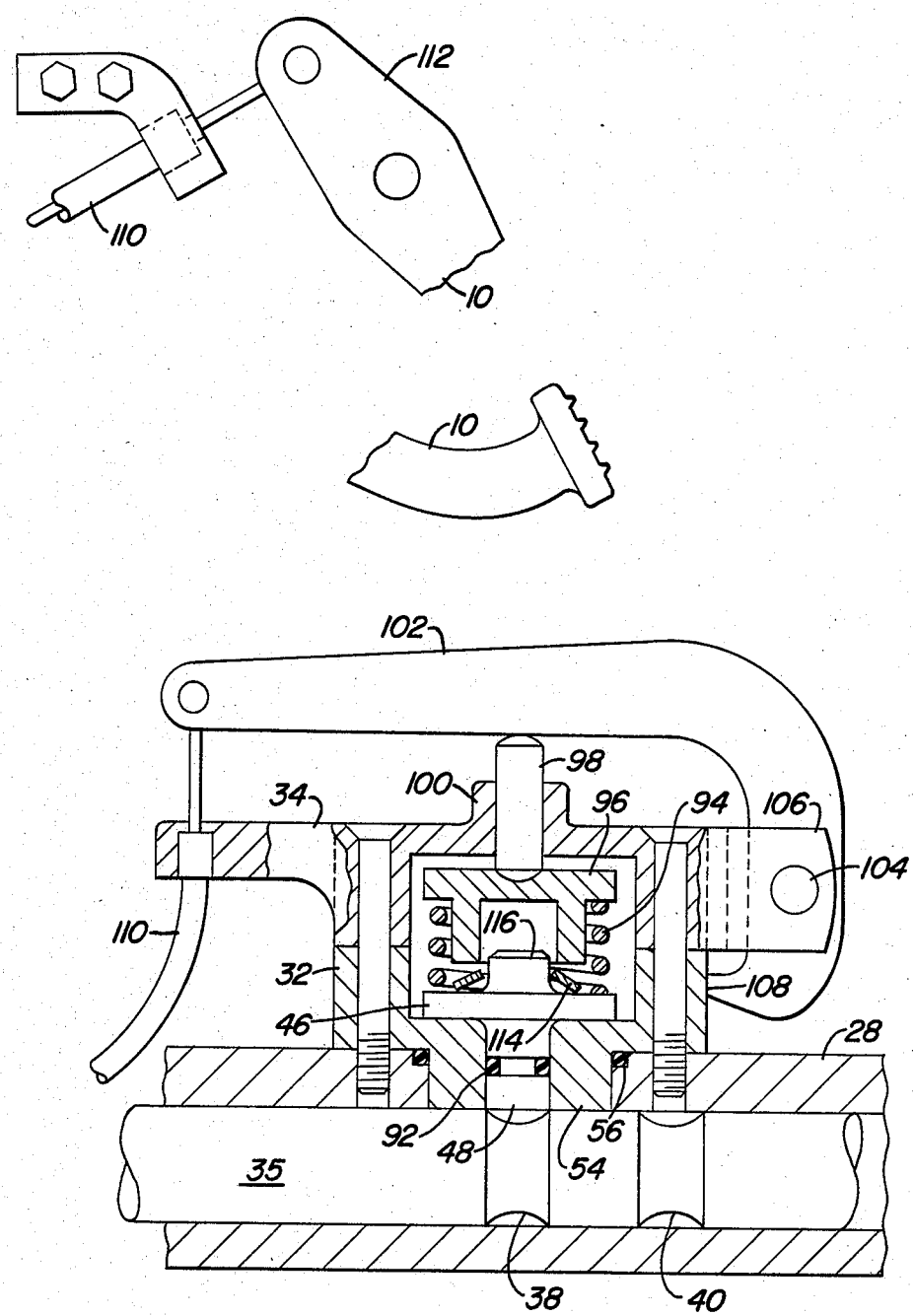
FIG. 5 is a cross-section of a first mechanical interlock device.

In the embodiment of FIG. 5, the plunger 48 cooperates with the grooves 38 and 40, just as in FIG. 2, but it is sealed now by an O-ring 92. Moreover, a helical compression spring 94 acts between the head 46 of the plunger 48 and a cup 96 against which bears a push rod 98 slideably mounted through a collar portion 100 of the cover 34. In the situation illustrated in FIG. 5, the plunger is free to cam out of the grooves 38 and 40 and it merely acts as a locating detent for the two positions of the selector rod 35. However, a lever 102 is pivotally mounted at 104 on a lug 106 integral with the cover 34. In the illustrated position, a stop tongue 108 of the lever 102 bears against the side of the base cup 32. The lever 102 bears against the top of the push rod 98.

The free end of the lever 102 is attached to one end of a Bowden cable 110, the other end of this cable being attached to an arm 112 of the clutch pedal 10. When the clutch pedal is depressed, the left-hand end of the lever 102, as shown in FIG. 5, is pulled down and the push rod, and hence the cup 96, are accordingly pushed downwards. The cup 96 prevents the plunger 48 from rising, and accordingly, a positive interlock is achieved, preventing shifting the rod 35 while the clutch pedal 10 is depressed. Since it is desirable to establish the interlock early in the stroke of the clutch pedal 10, a Belleville spring 114 is located on a boss 116 projecting from the top of the plunger head 46 and the spring 114 is selected to be a very strong spring. Accordingly, after a small initial depression of the cup 96, the cup starts to compress the spring 114 against the plunger head 46 and sufficient force is rapidly generated in this way to prevent the plunger 48 being cammed out of the groove 38 or 40. Nevertheless, it remains possible to complete compression of the spring 114 as the stroke of the clutch pedal 10 is completed. When the spring 114 is not compressed, the spring 94 is light enough to allow the plunger 48 to be cammed out of the grooves 38 or 40.

Figure 6:
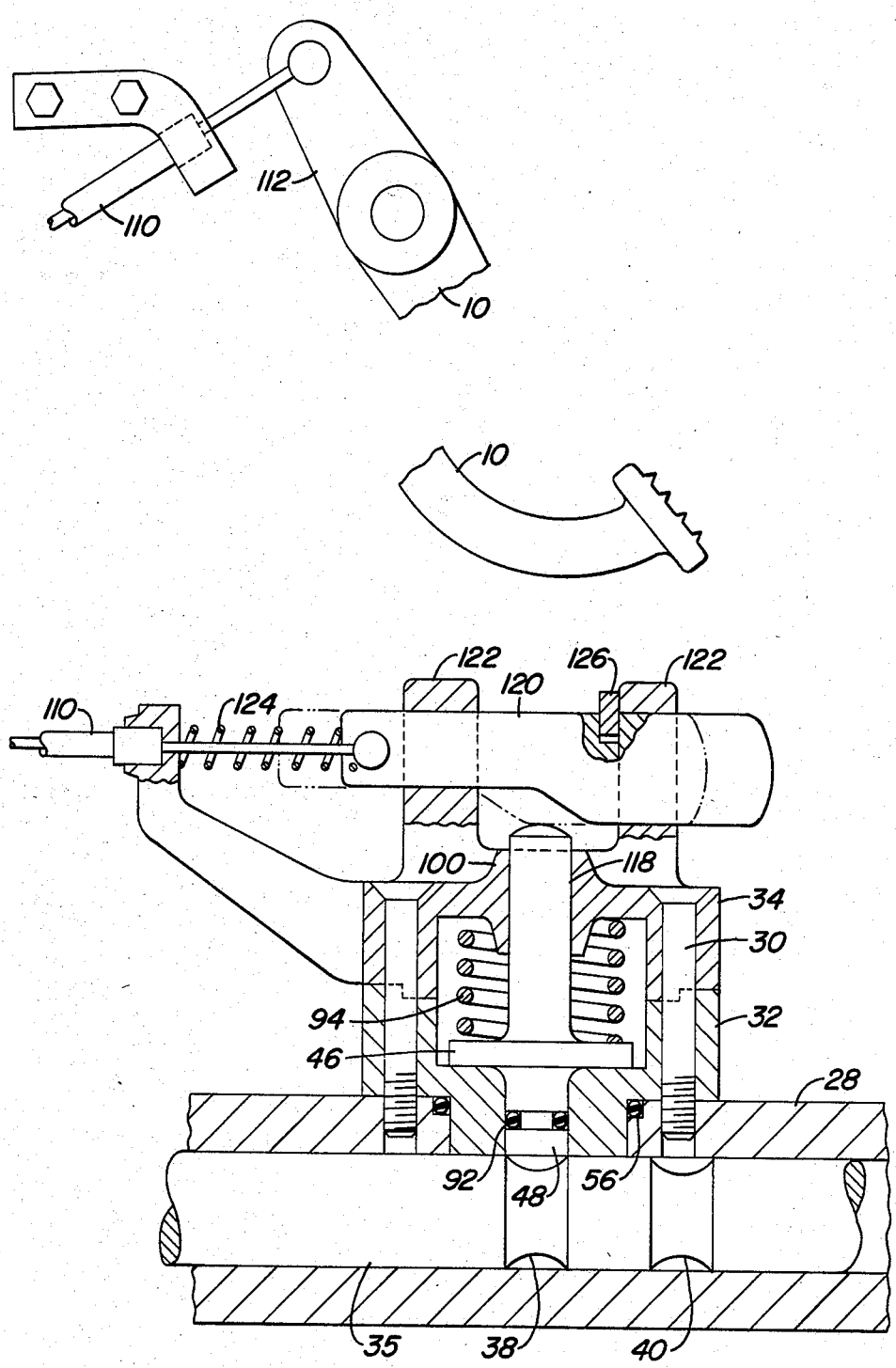
FIG. 6 is a cross-section of a second mechanical interlock device.

In the modified embodiment, according to FIG. 6, the spring 94 acts between the plunger head 46 and the cover 34 and the boss 116 of FIG. 5 is replaced by a roll 118 integral with the plunger 48 and extending out through the collar portion 100 of the cover 34. Above the top of the rod 118, a slide 120 is mounted slideable in lugs 22 integral with the cover and it is now the slide 120 which is controlled by the Bowden cable 110.

In the illustrated position, the rod 118 is free to rise and it is therefore possible to cam the plunger 48 out of the groove 38 or 40 against the action of the relatively light spring 94. When the clutch pedal 10 is depressed, the slide 120 is pulled to the left in FIG. 6 against the action of a return spring 124. The retracted position of the slide is shown in broken lines and it can be seen that a ramp portion 126 of the slide moves over the head of the rod 118 and positively blocks rising of the rod and hence rising of the plunger 48. In a tractor, the load shift gear is normally provided in a transmission which has a gear range selector as well as the main change speed gear. The construction and operation of the various gears, themselves, form no part of the present invention.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

We claim:

1. A gear shift arrangement for a vehicle with a main change-speed gear, a clutch which is disengaged when a gear change is effected, and a load shift gear which is operable while the vehicle is under load, comprising:
   an interlock device between the clutch and the load shift gear, the interlock device continuously engaging the load shift gear to prevent any shifting of the load shift gear independent of the position of the load shift gear, when the clutch is disengaged.

2. A gear shift arrangement, according to claim 1, wherein:
   the clutch is a hydraulic clutch and the interlock device is responsive to hydraulic pressure in a hydraulic circuit of the hydraulic clutch.

3. A gear shift arrangement, according to claim 2, wherein:
   the interlock device comprises an interlock plunger attached to a bellows within which there acts the hydraulic pressure in the clutch hydraulic circuit.

4. A gear shift arrangement, according to claim 3, wherein:
   the interlock plunger projects into a casing of the load shift gear and the bellows is in a chamber into which transmission fluid from the load shift gear can bleed and which has a return connection to a sump serving the load shift gear.

5. A gear shift arrangement, according to claim 4, wherein:
   the plunger has a groove through which transmission fluid may bleed into the chamber.

6. A gear shift arrangement, according to claim 1, wherein:
   the interlock device is mechanically linked to the clutch via linkage.

7. A shift gear arrangement, according to claim 6, wherein:
   the linkage comprises a Bowden cable coupled between the interlock device and a clutch pedal movable to actuate the clutch.

8. A gear shift arrangement, according to claim 6, wherein: the interlock device comprises:
   a selector rod coupled to the load shift gear and having detent grooves therein;
   a detent plunger engageable with the selector rod and receivable by the detent grooves to prevent movement of the selector rod and the load shift gear;
   a linkage member coupled to and movable in response to the movement of mechanical linkage; and
   a compression spring compressable between the linkage member and the detent plunger to permit the linkage member to engage the detent plunger and hold the detent plunger in one of the detent grooves.

9. A shift gear arrangement, according to claim 8, further comprising:
   a further and stronger spring which is located between the detent plunger and the linkage member, the linkage member engaging the further spring to bias it and the detent plunger towards the selector rod before complete compression of the compression spring is achieved.

10. A shift gear arrangement of claim 6, wherein the interlock device comprises:
    a selector rod coupled to the load shift gear and having detent grooves therein;
    a detent plunger engageable with the selector rod and movable to a position wherein it is received by the detent grooves;
    a resilient member biased to urge the detent plunger towards the selector rod; and
    a stop member movable in the mechanical linkage to a position engaging the detent plunger, this engagement between the stop member and the detent plunger preventing the detent plunger from moving out of the detent groove which receives it.

11. In a gear shift arrangement for a vehicle with a main change-speed gear, an hydraulically-operated clutch which is disengageable when a gear change is effected and a load shift gear which is operable while the vehicle is under load, an interlock device comprising:
    a selector rod coupled to the load shift gear and having a detent groove therein;
    a detent plunger engageable with the selector rod and receivable by the detent grooves;
    pressure-responsive means coupled to the detent plunger; and
    means for communicating pressurized fluid from a circuit of the hydraulically-operated clutch to the pressure-responsive means so that the pressure-responsive means holds the detent plunger in the detent groove to prevent movement of the selector rod and to prevent shifting of the load shift gear, independent of the position of the load shift gear, when the hydraulically-operated clutch is disengaged.

12. The invention of claim 11, wherein:
    the load change gear includes a housing which slidably receives the detent plunger and which encloses a chamber in which is mounted the pressure-responsive means, the interlock device including bleed means for communicating transmission fluid in the load change gear to the chamber and return means for communicating this transmission fluid to a sump serving the load change gear.

13. In a gear shift arrangement for a vehicle having a main change-speed gear, a mechanically-operated clutch which is disengageable when a gear change is effected, and a load shift gear which is operable while the vehicle is under load, an interlock device comprising:
    a selector rod coupled to the load shift gear and having a detent groove therein;
    a detent plunger engageable with the selector rod and receivable by the detent grooves;
    resilient means biased to urge the detent plunger towards the selector rod;
    a mechanical linkage operatively coupled to the clutch and movable in response to engagement and disengagement of the clutch; and
    a linkage member coupled to the mechanical linkage and movable with the mechanical linkage to a locking position engaging the detent plunger to hold the detent plunger in the detent groove when the clutch is disengaged to prevent movement of the selector rod and shifting the load shift gear.

* * * * *